US012476376B2

(12) United States Patent
Ilvonen et al.

(10) Patent No.: US 12,476,376 B2
(45) Date of Patent: Nov. 18, 2025

(54) MULTI-FEED ANTENNA ARRANGEMENT FOR ELECTRONIC APPARATUS

(71) Applicant: HUAWEI TECHNOLOGIES CO., LTD., Shenzhen (CN)

(72) Inventors: Janne Ilvonen, Helsinki (FI); Rasmus Luomaniemi, Espoo (FI); Anu Lehtovuori, Espoo (FI); Ville Viikari, Espoo (FI); Alexander Khripkov, Helsinki (FI); Joonas Krogerus, Helsinki (FI); Riku Kormilainen, Espoo (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 18/362,577

(22) Filed: Jul. 31, 2023

(65) Prior Publication Data

US 2023/0378654 A1 Nov. 23, 2023

Related U.S. Application Data

(63) Continuation of application No. PCT/EP2021/052058, filed on Jan. 29, 2021.

(51) Int. Cl.

*H01Q 9/04* (2006.01)
*H01Q 1/24* (2006.01)
*H01Q 1/50* (2006.01)

(52) U.S. Cl.

CPC ............. *H01Q 9/045* (2013.01); *H01Q 1/243* (2013.01); *H01Q 1/50* (2013.01); *H01Q 9/0442* (2013.01)

(58) Field of Classification Search

CPC ....... H01Q 1/243; H01Q 9/045; H01Q 9/0457
See application file for complete search history.

(56) References Cited

U.S. PATENT DOCUMENTS 7,084,815 B2 8/2006 Phillips et al.
10,290,946 B2 5/2019 Romano et al.
(Continued)

FOREIGN PATENT DOCUMENTS

EP 3168930 A1 5/2017

OTHER PUBLICATIONS

Liu et al., "A Differentially Fed Dual-Polarized Slot Antenna With High Isolation and Low Profile for Base Station Application," IEEE Antennas and Wireless Propagation Letters, vol. 18, No. 2, Piscataway, NJ, US, XP011707813, Total 5 pages, Institute of Electrical and Electronics Engineers, New York, New York (Feb. 2019).
(Continued)

*Primary Examiner* — Daniel Munoz
(74) *Attorney, Agent, or Firm* — Leydig, Voit & Mayer, Ltd.

(57) ABSTRACT

An antenna arrangement comprising a dielectric element, at least one conductive element, an antenna radiator, and a plurality of exciter elements. The antenna radiator arranged at a first surface of the dielectric element and at a distance from the conductive element such that a gap is formed between the antenna radiator and a first surface of the conductive element. The exciter elements extend at least partially through a gap and are arranged on or adjacent to the conductive element. The antenna radiator may comprise a conductive material and be printed, sintered, painted, laminated, or deposited onto the first surface of the dielectric element, or molded into the dielectric element.

18 Claims, 4 Drawing Sheets

(56) References Cited

U.S. PATENT DOCUMENTS

| | | | | |
|---|---|---|---|---|
| 2008/0194302 | A1 | 8/2008 | Castaneda et al. | |
| 2023/0361449 | A1* | 11/2023 | Hsu | H01Q 9/045 |

OTHER PUBLICATIONS

Rahmi Barani et al., "Low-Profile Wideband Conjoined Open-Slot Antennas Fed by Grounded Coplanar Waveguides for 4x4 5G MIMO Operation," IEEE Transactions on Antennas and Propagation, vol. 68, No. 4, Total 12 pages, Institute of Electrical and Electronics Engineers, New York, New York (Apr. 2020).

Bhartia et al., "Frequency Agile Microstrip Antennas," Microwave Journal, vol. 25, No. 10, Dedham, Massachusetts, USA, XP001387848, Total 4 pages (Oct. 1, 1982).

Liu et al., "An Extremely Low-Profile Wideband MIMO Antenna for 5G Smartphones," IEEE Transactions on Antennas and Propagation, vol. 67, No. 9, Total 9 pages, Institute of Electrical and Electronics Engineers, New York, New York (Sep. 2019).

Kim et al., "A parallel-plate-mode suppressed meander slot antenna with plated-through-holes," IEEE Antennas and Wireless Propagation Letters, vol. 4, Total 3 pages, Institute of Electrical and Electronics Engineers, New York, New York (Jun. 2005).

Hannula et al., "Beneficial Interaction of Coupling and Mismatch in a Two-Antenna System," 13th European Conference on Antennas and Propagation (EuCAP 2019), Total 4 pages (Mar. 2019).

* cited by examiner

MULTI-FEED ANTENNA ARRANGEMENT FOR ELECTRONIC APPARATUS

CROSS-REFERENCE TO RELATED APPLICATIONS

This application is a continuation of International Application No. PCT/EP2021/052058, filed on Jan. 29, 2021, the disclosure of which is hereby incorporated by reference in its entirety.

TECHNICAL FIELD

Embodiments of the disclosure relate to an antenna arrangement for an electronic device, the antenna arrangement comprising an antenna radiator and a plurality of antenna feeds.

BACKGROUND

Electronic apparatuses, such as smartphones, have to support more and more cellular radio technology, for example, 5G requires new radio technology to be added since the used frequency range will be expanded from so-called sub-6 GHz to millimeter-wave (mmWave) frequencies, e.g., above 20 GHz. To achieve mmWave frequencies, the antenna array is usually implemented in a module that is fixed to the main printed circuit board (PCB) of the smartphone. The PCB may comprise an antenna array where the main radiation beam direction is the broadside direction, i.e., perpendicular to the display and back cover of the smartphone. The PCB may also be configured such that the main radiation beam direction is the end-fire direction, i.e., parallel to the display and the back cover of the smartphone. In the latter case, the antenna array usually occupies some space within the metal rim of the apparatus.

These mmWave modules leave very limited space available within the apparatus for other components such as additional antennas, in particular due to several modules being necessary in order to achieve sufficiently good multi-surface spherical beam coverage.

Furthermore, modern smartphones require antenna systems that can cover multiple frequency bands with wide bandwidths and several multiple input multiple output (MIMO) antennas operating in each band.

Currently, antennas for the 700-960 MHz and 1700-2700 MHz bands are usually realized using sections of the metal rim of the apparatus, i.e., a space which is already occupied by, e.g., mmWave antenna arrays. In order to be able to fit in additional antennas, such as sub-6 GHz 5G NR antennas, other free space within the smartphone has to be utilized for these additional antennas.

The greatest challenge to providing additional antenna elements within a smartphone is, in other words, the extremely limited volume available, especially as far as the thickness of the smartphone is concerned. Current low-profile antennas are often too thick and integrating them with existing structures and components is often very difficult.

Therefore, there is a need for new antennas that have low profiles and which can be easily integrated into the difficult environment inside modern smartphones.

SUMMARY

It is an object to provide an improved antenna arrangement for an electronic apparatus. The foregoing and other objects are achieved by the features of the independent claim. Further implementation forms are apparent from the dependent claims, the description, and the figures.

According to a first aspect, there is provided an antenna arrangement comprising a dielectric element, at least one conductive element, an antenna radiator, and a plurality of exciter elements. The antenna radiator is arranged at a first surface of the dielectric element and at a distance from the conductive element such that a gap is formed between the antenna radiator and a first surface of the conductive element. The exciter elements extend at least partially through the gap and are arranged on or adjacent to the conductive element.

Such a configuration allows utilizing an already existing gap, which gap, e.g., is necessary to accommodate battery expansion and manufacturing tolerances, for creating the radiating currents of an antenna arrangement. By using an already existing volume inside an electronic apparatus, effectively utilizing one volume for two purposes, it is possible to decrease the physical size of the antenna while providing a larger effective volume as compared to state-of-the-art solutions. Furthermore, using multiple exciter elements enables control and adaption of the coupling level between the feeds of the antenna arrangement. When properly designed, this coupling can be used to cancel parts of the reflected power and increase the radiated power. Additionally, only a smaller section of the area of the dielectric element needs to be used for the antenna arrangement. This is an advantage since the remaining area of the dielectric element, such as the back cover, can accommodate other required components such as camera modules.

In a possible implementation form of the first aspect, the antenna radiator comprises a conductive material and is one of printed, sintered, painted, laminated, or deposited onto the first surface of the dielectric element, or molded into the dielectric element. This not only allows the antenna radiator to have any suitable shape or dimensions, but also allows it to be applied onto, or into, the dielectric element in several suitable ways.

In a further possible implementation form of the first aspect, the antenna radiator is conductively isolated from the conductive element. A conductive element, such as the main chassis of an electronic apparatus, is electrically too large to contribute to radiation above about 2 GHz frequencies in an efficient and controlled manner. However, with a separate local chassis antenna, in the form of an antenna radiator, the antenna dimensions can be designed so that the antenna radiates optimally at the desired frequency bands.

In a further possible implementation form of the first aspect, the exciter elements are arranged along a peripheral edge of the antenna radiator. With such placement, the exciter elements do not affect or influence the gap volume necessary to, e.g., accommodate battery expansion.

In a further possible implementation form of the first aspect, the exciter elements are superposed with the antenna radiator. This allows the exciter elements to be coupled to each other and/or the number of exciter elements to be reduced.

In a further possible implementation form of the first aspect, the antenna arrangement comprises at least a first pair of exciter elements and a second pair of exciter elements, the first pair of exciter elements being decoupled from the second pair of exciter elements. This allows the antenna arrangement to effectively form two frequency tunable antennas that cannot be controlled independently but are always tuned to the same frequency, achieving an increased antenna efficiency.

In a further possible implementation form of the first aspect, a first exciter element is coupled to a second exciter element of the first pair of exciter elements, and a first exciter element is coupled to a second exciter element of the second pair of exciter elements, and the first pair of exciter elements is coupled to the second pair of exciter elements, the couplings being made by means of a first feeding network and exciting a first antenna signal having a first polarization, effectively reducing the number of components needed while still achieving sufficient signal levels.

In a further possible implementation form of the first aspect, the first exciter element of the first pair of exciter elements is coupled to the first exciter element of the second pair of exciter elements, and the second exciter element of the first pair of exciter elements is coupled to the second exciter element of the second pair of exciter elements, the first exciter elements are coupled to the second exciter elements, the couplings being made by means of a second feeding network and exciting a second antenna signal having a second polarization, the second polarization being orthogonal to the first polarization. This way, two frequency tunable antennas are formed which achieve orthogonal polarization.

In a further possible implementation form of the first aspect, each exciter element is galvanically, capacitively, or inductively coupled to at least one other exciter element and/or antenna radiator. Galvanic coupling provides a reliable and well-known type of coupling. Non-contacting couplings, like capacitive and inductive couplings, can be manufactured, e.g., on the PCB or the apparatus chassis along with any required matching networks and other control circuits.

In a further possible implementation form of the first aspect, the first polarization is −45° and the second polarization is +45°, improving the equality in received signal levels and improving coverage in congested environments.

In a further possible implementation form of the first aspect, the first feeding network and/or the second feeding network comprise a power divider coupled to a first phase shifter and a second phase shifter, a phase of the second exciter element being shifted by 180° compared to a phase of the first exciter element, the proper phase shift between the feeding signals facilitating optimal performance of the multi-feed operation.

In a further possible implementation form of the first aspect, the conductive element is configured such that the distance between the first surface of the dielectric element and the first surface of the conductive element is variable, allowing conductive elements such as batteries to expand thermally and/or manufacturing tolerances to be considered.

In a further possible implementation form of the first aspect, the antenna arrangement comprises at least one tunable element for tuning the resonant frequencies of the antenna arrangement. Tunable matching components can be used to tune the impedance of the feed port of the exciter elements to be optimal for each frequency sub-band.

In a further possible implementation form of the first aspect, the tunable element is a varactor, a switch, and/or a phase shifter, allowing tuning to be executed by means of a variety of components.

In a further possible implementation form of the first aspect, the resonant frequencies are tuned by the tunable element(s) in response to the variation of the distance between the first surface of the dielectric element and the first surface of the conductive element, allowing the gap between the dielectric element and conductive element to not only accommodate thermal expansion of the conductive element but to also provide an effective antenna volume.

In a further possible implementation form of the first aspect, the tunable element(s) are configured to optimize radiation modes of the antenna arrangement and/or to use a change in the radiation modes for tuning the resonant frequencies.

In a further possible implementation form of the first aspect, the conductive element is a battery, the variation of distance being due to thermal expansion of the battery. This allows existing components to contribute to the performance of the antenna arrangement.

In a further possible implementation form of the first aspect, the antenna radiator is a patch radiator, the patch radiator optionally comprising at least one slot. Such an antenna radiator takes up very little space, as seen in the direction of the gap, and is easily fitted to or molded into the dielectric element.

In a further possible implementation form of the first aspect, the patch radiator comprises two slots, the slots extending in parallel in a first direction and being offset in a second direction perpendicular to the first direction. By providing a second slot, a further resonance can be excited without significantly affecting the resonances excited by the patch and first slot.

In a further possible implementation form of the first aspect, the patch radiator comprises four slots, each slot extending colinearly with one of the slots and orthogonally to the remaining slots, each slot extending from one peripheral edge, and towards a center point, of the patch radiator. This allows the number of exciter elements to be reduced, while providing an antenna arrangement that effectively comprises two frequency tunable antennas having orthogonal polarization and which are controlled simultaneously to the same frequency.

In a further possible implementation form of the first aspect, wherein the slots form a cross-shape, the cross-shape being interrupted at the common center point. By providing additional slots, further resonances can be excited.

In a further possible implementation form of the first aspect, the tunable elements are arranged at the peripheral edges of the patch radiator, each tunable element being arranged adjacent one of the slots, allowing the operating frequency of each slot to be tuned.

In a further possible implementation form of the first aspect, the dimensions of the slots and/or the number of slots is configured to generate one or more desired resonant frequencies, improving the performance of the antenna arrangement.

In a further possible implementation form of the first aspect, the antenna radiator comprises several individual radiator sections separated by dielectric gaps, allowing a multimode antenna arrangement.

According to a second aspect, there is provided an apparatus comprising the antenna arrangement according to the above, a display, and a housing, the housing comprising the dielectric element of the antenna arrangement, the conductive element of the antenna arrangement being one of a battery, a printed circuit board, and an apparatus chassis.

This solution allows an empty volume within the apparatus, e.g. due to the gap between the conductive element and apparatus housing, to be utilized by antennas. Furthermore, no additional printed circuit board is required for the antenna arrangement since the excitation elements, feeding structures, and matching and tuning circuits can be arranged on the main printed circuit board.

This and other aspects will be apparent from and the embodiments described below.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 1:
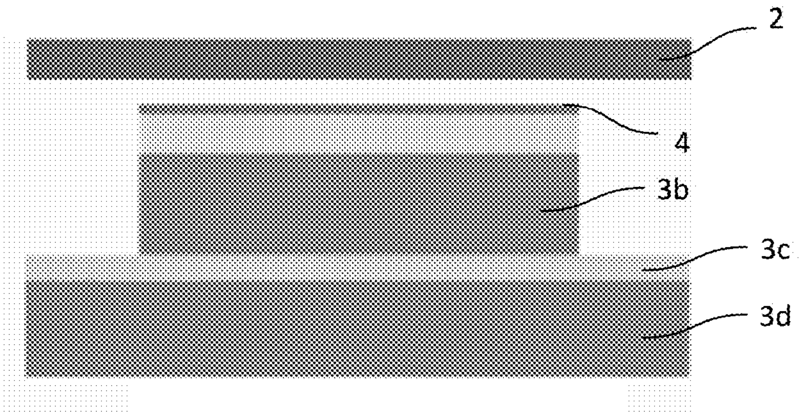
Fig. 1 (Prior art)
FIG. 1 shows a partial and schematic cross-sectional view of an antenna arrangement according to the prior art.

FIG. 1 illustrates an antenna arrangement according to prior art. The antenna arrangement comprises a dielectric element 2, e.g., the back cover of an electronic apparatus such as a smartphone or a tablet, a battery 3*b*, a printed circuit board 3*c* (PCB), an apparatus chassis 3d, and an antenna radiator 4 connected to a separate antenna PCB. There is a gap between the antenna radiator 4 and dielectric element 2, necessary to accommodate, e.g., thermal expansion of the battery 3*b*.

Figure 2:
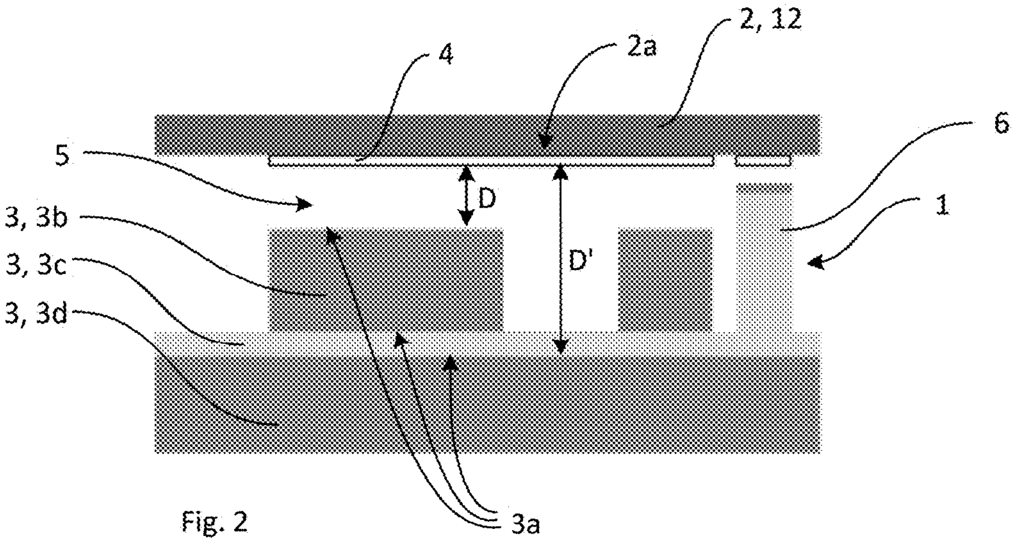
FIG. 2 shows a partial and schematic cross-sectional view of an antenna arrangement according to an example of the embodiments of the disclosure.

FIG. 2 illustrates one embodiment of the present invention, wherein the antenna arrangement 1 comprises a dielectric element 2, as mentioned above possibly the back cover of an electronic apparatus such as a smartphone or a tablet, at least one conductive element 3 such as a battery 3*b*, a PCB 3*c*, and/or an apparatus chassis 3d, as well as an antenna radiator 4 connected to the dielectric element 2. The gap 5 extends between the antenna radiator 4 and the conductive element 3, i.e., the antenna radiator 4 and the conductive element 3 are at least partially stacked on top of each other as seen in a direction perpendicular to the display or a back cover of an apparatus 10. A plurality of exciter elements 6 extend at least partially through gap 5 and are arranged on or adjacent to the conductive element 3. The antenna arrangement 1 may have a very low profile, e.g., a thickness as low as about 0.5 mm.

Figure 3:
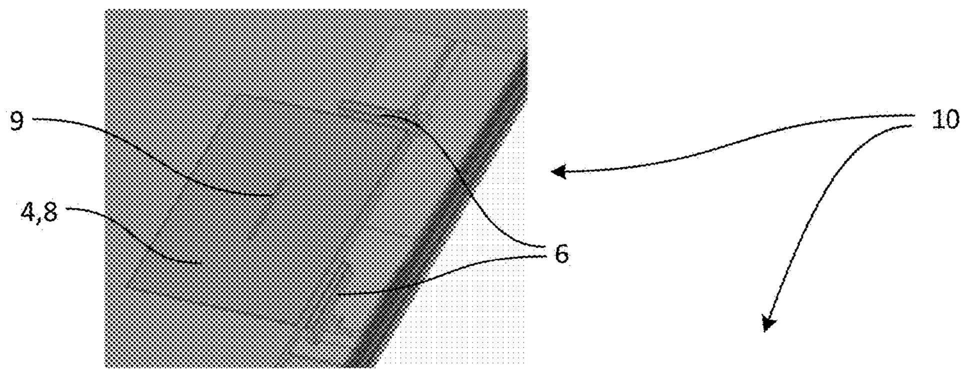
FIG. 3 shows a partial perspective view of an electronic apparatus comprising an antenna arrangement according to an example of the embodiments of the disclosure.
Figure 4:
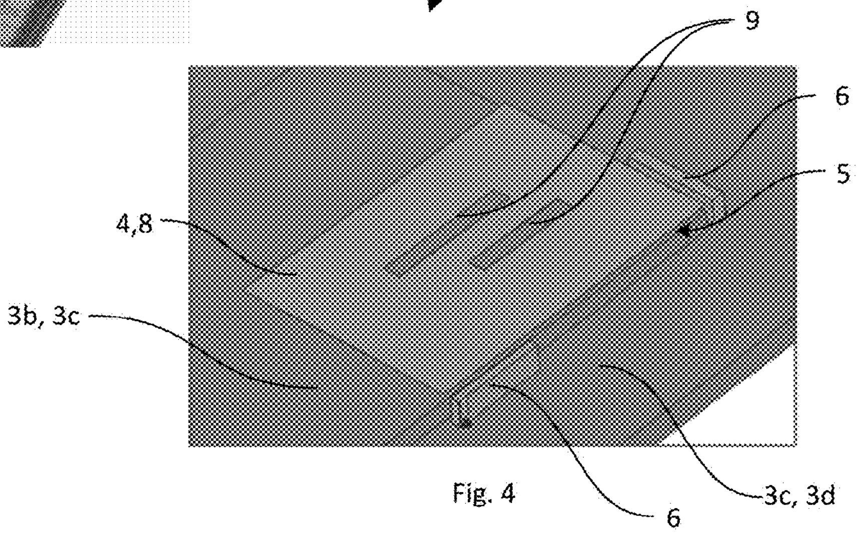
FIG. 4 shows a partial perspective view of an electronic apparatus comprising an antenna arrangement according to an example of the embodiments of the disclosure.
Figure 6:
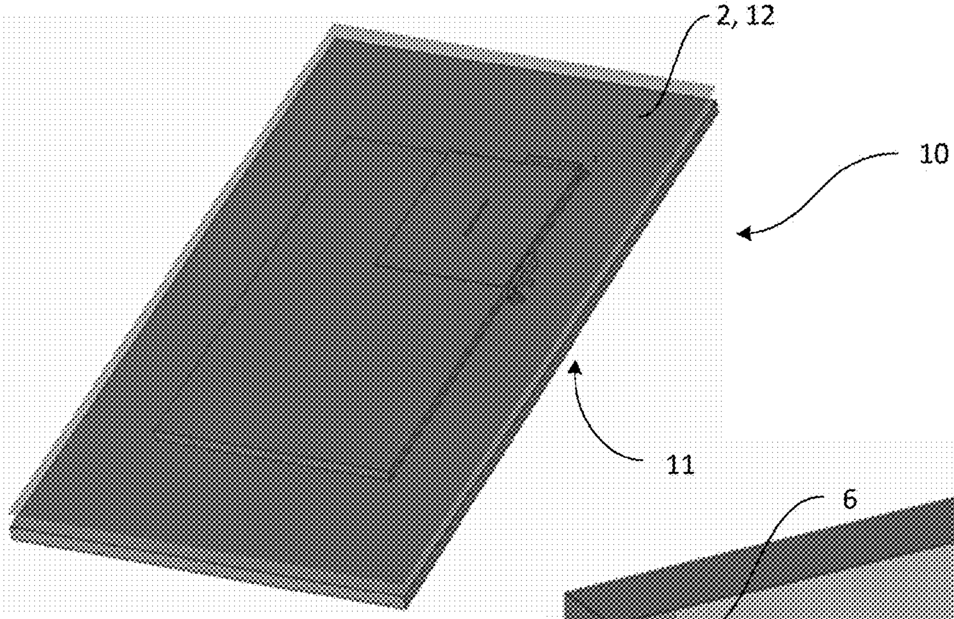
FIG. 6 shows a perspective view of an electronic apparatus comprising an antenna arrangement according to an example of the embodiments of the disclosure.

FIGS. 3, 4, and 6 show embodiments of the apparatus 10 comprising an antenna arrangement 1. The apparatus 10 further comprises a display 11, and a housing 12. The housing comprises the dielectric element 2 of the antenna arrangement 1, and, as mentioned above, the conductive element 3 of the antenna arrangement 1 is one or several of the battery 3*b*, the printed circuit board 3*c*, and the apparatus chassis 3d.

The antenna radiator 4 is arranged at a first surface 2*a* of the dielectric element 2 and at a distance D, D' from the conductive element 3 such that the gap 5 is formed between the antenna radiator 4 and a first surface 3*a* of the conductive element 3. As shown in FIG. 2, the gap may extend between the antenna radiator 4 and the battery 3*b*, and/or between the antenna radiator 4 and the apparatus chassis 3d. The effective antenna volume, formed by the gap 5, can be defined differently depending on which conductive element 3 is used as part of the antenna arrangement 1. Furthermore, the conductive element 3 may be configured such that the distance D, D' between the first surface 2*a* of the dielectric element 2 and the first surface 3*a* of the conductive element 3 is variable. When the conductive element 3 is a battery, the variation of distance D, D' is at least partially due to thermal expansion of the battery.

The antenna radiator 4 may comprise a conductive material and be one of printed, sintered, painted, laminated, or deposited onto the first surface 2*a* of the dielectric element 2, or molded into the dielectric element 2. For example, the antenna radiator 4 may be a metal pattern printed on the inner surface of a glass back cover, or may be painted thereon. The antenna radiator may be completely planar or follow the shape of the first surface 2*a* of the dielectric element 2.

Furthermore, the antenna radiator 4 may be conductively isolated from the conductive element 3, and the ground plane of the apparatus 10.

Figure 5:
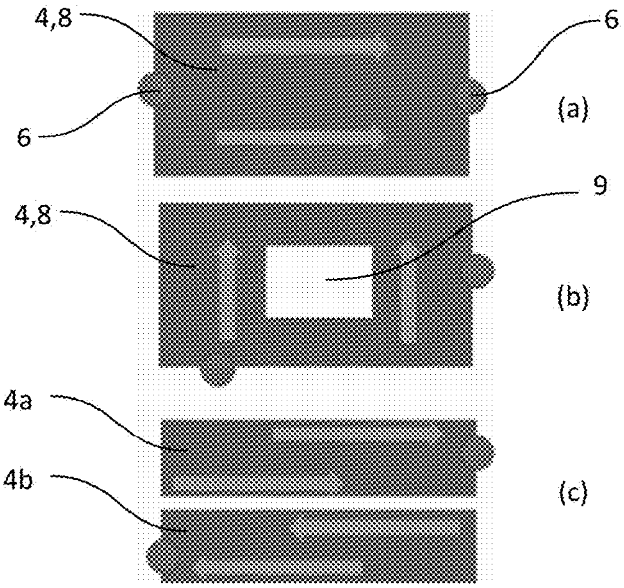
FIGS. 5*a*-5*c* show schematic top views of partial antenna arrangements according to examples of the embodiments of the disclosure.

The antenna radiator 4 may comprise several individual radiator sections separated by dielectric gaps, as shown in FIG. 5, allowing multimode use. The properties of the antenna arrangement 1 could, in this case, be modified even further with the use of aperture matching components and different non-metal materials, such as high permittivity blocks, could be used.

The antenna radiator 4 may be a patch radiator 8, the patch radiator 8 optionally comprising at least one slot 9 as shown in FIGS. 5*b* and 5*c*. FIG. 5*a* sows a patch radiator 8 without a slot. The patch radiator 8 may be rectangular, disc-shaped, ellipsoid, or have any other suitable shape. The slot(s) 9 may be rectangular or have any other suitable shape.

Figure 10:
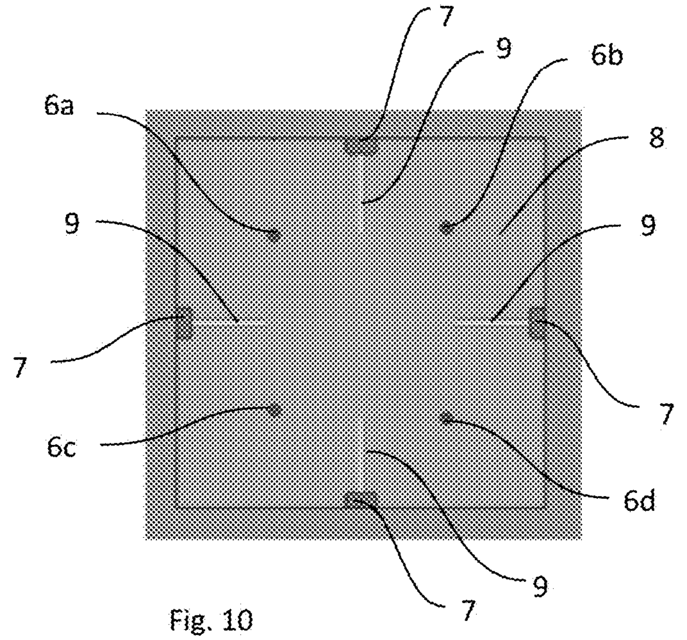
FIG. 10 shows a schematic top view of a partial antenna arrangement according to an example of the embodiments of the disclosure.

A patch radiator 8 comprising one slot is shown in FIGS. 3, 5*b*, 5*c*, and 6. The patch radiator 8 may also comprise two slots 9, as shown in FIG. 4, or four slots 9 as shown in FIG. 10.

In an embodiment comprising two slots 9, the slots 9 may extend in parallel in a first direction while being offset in a second direction perpendicular to the first direction, as shown in FIG. 4.

When the patch radiator 8 comprises four slots 9, each slot 9 may extend colinearly with one of the slots 9 and orthogonally to the remaining slots 9, each slot 9 extending from one peripheral edge, and towards a center point, of the patch radiator 8. In other words, the slots 9 together form an X or cross shape, the X or cross being interrupted at their common center point such that the center point comprises radiator material, as shown in FIG. 10.

The dimensions of the antenna radiator 4 define the resonance modes. The longitudinal dimension of the antenna radiator 4 defines the lowest resonance, and the orthogonal dimension (width) of the antenna radiator 4 defines the highest resonance.

The dimensions of the slots 9 and/or the number of slots 9 may be configured to generate one or more desired resonant frequencies. By providing a second slot, a third resonance can be excited without significantly affecting the two initial resonances excited by the patch and first slot.

By increasing the slot 9 width, the current path along the longest dimension may be made longer, shifting the first resonant frequency and the third resonant frequency down. The same happens for the second resonant frequency. Since the second resonant frequency is created from a collaborative use of exciting elements 6 and it uses a diagonal current pattern, see the diagonally arranged exciter elements 6 in FIGS. 3, 4, 5*b*, and 5*c*, increasing the length of the slot increases the current path and shifts this frequency down. Due to the different current distributions, the slot width does not significantly affect the second resonance frequency. The slot length, on the other hand, has only a minor effect on the first and third resonance frequencies.

The radiation modes of the antenna radiator 4 are mainly affected by two factors, i.e., the size and shape of the antenna radiator 4 and the exciter elements 6. In addition to the radiating modes, also the impedances need to be designed simultaneously so that the multiple feeds can be utilized effectively.

The exciter elements 6, exciting radiating currents in the antenna radiator 4, may be arranged along a peripheral edge of the antenna radiator 4, as shown in FIGS. 2 to 9. As shown in FIGS. 3, 4, and 5*b*, the exciter elements 6 may be arranged along orthogonally extending edges of the antenna radiator 4. The exciter elements 6 may also be arranged along parallel edges of the antenna radiator 4 at the same width as shown in FIG. 5*a* and at different widths as shown in FIG. 5*c*.

Figure 11:
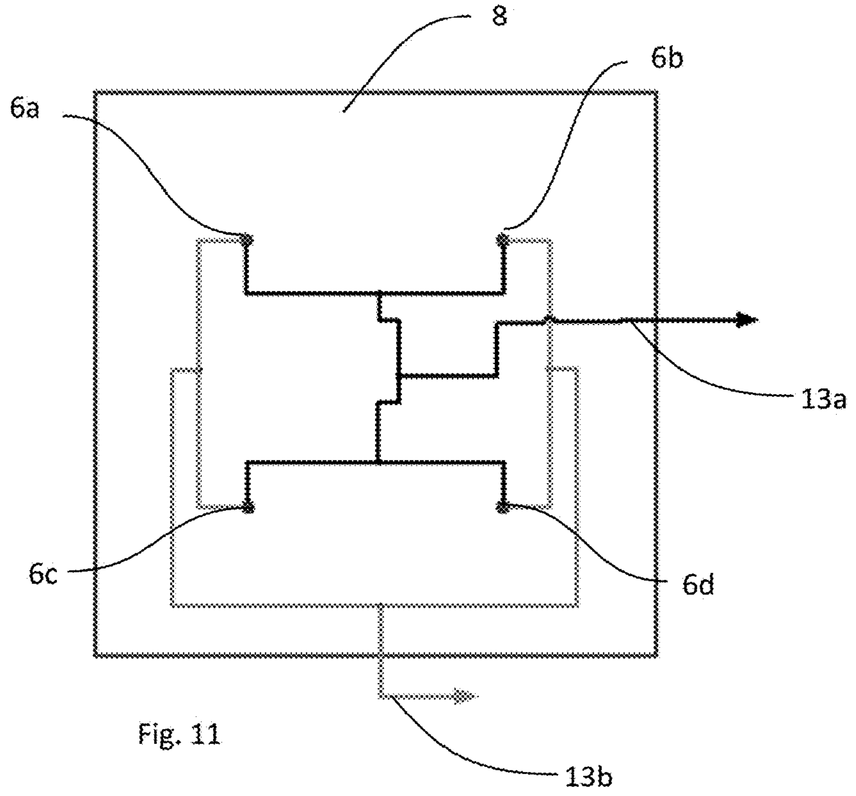
FIG. 11 shows an illustration of a partial antenna arrangement according to an example of the embodiments of the disclosure.

Optionally, the exciter elements 6 may be superposed with the antenna radiator 4, as shown in FIGS. 10 and 11. The exciter elements 6 may be distributed symmetrically, one in each quadrant of the antenna radiator 4.

With one exciter element 6, one radiation mode may be effectively excited, along the longest dimension of the antenna radiator 4. The S-parameters of the antenna have two resonances in the 3.3-4.2 GHz frequency band. By providing several exciter elements 6, a further radiation mode is excited as a result of the combined operation of both exciter elements 6. Similarly, for the S-parameters, a new resonance is created so that three resonances appear in the desired frequency band.

Figure 7:
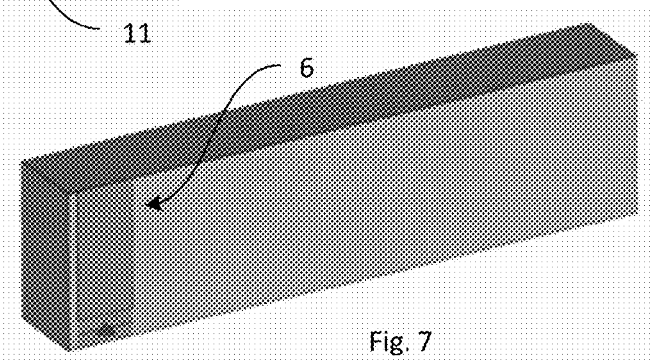
FIG. 7 shows a partial perspective view of an antenna arrangement according to an example of the embodiments of the disclosure.
Figure 8:
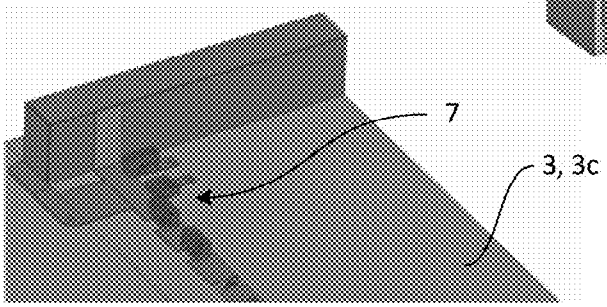
FIG. 8 shows a partial perspective view of an antenna arrangement according to an example of the embodiments of the disclosure.
Figure 9:
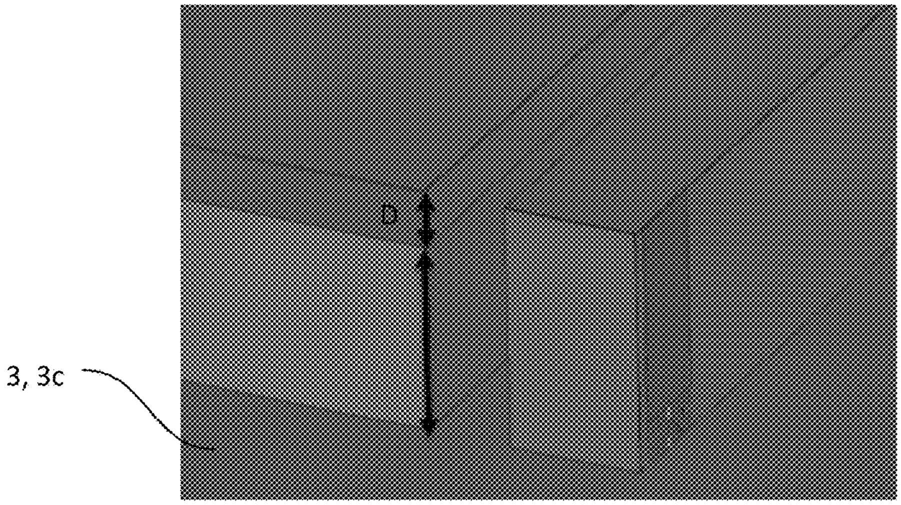
FIG. 9 shows a partial perspective view of an antenna arrangement according to an example of the embodiments of the disclosure.

The exciter elements 6 may be any suitable, conventional type of exciter element 6. FIGS. 6 to 8 shows an embodiment comprising an inverted-F antenna (IFA) type exciter element 6. With the antenna arrangement operating in the N77 band, the maximum required instantaneous bandwidth requirement is 100 MHz. Therefore, the tunable elements 7 would have to be designed to be constant on nine separate 100 MHz sub-bands.

When the exciter elements 6 are superposed with the antenna radiator 4, the antenna arrangement may be configured to comprise at least a first pair of exciter elements 6*a*, 6*b* and a second pair of exciter elements 6*c*, 6*d*, the first pair of exciter elements 6*a*, 6*b* being decoupled from the second pair of exciter elements 6*c*, 6*d* as shown in FIG. 11.

A first exciter element 6*a* may be coupled to a second exciter element 6*b* of the first pair of exciter elements 6*a*, 6*b*, and a first exciter element 6*c* may be coupled to a second exciter element 6*d* of the second pair of exciter elements 6*c*, 6*d*. Furthermore, the first pair of exciter elements 6*a*, 6*b* may be coupled to the second pair of exciter elements 6*c*, 6*d*, the couplings being made by means of a first feeding network 13*a* and exciting a first antenna signal having a first polarization.

Simultaneously, or optionally, the first exciter element 6*a* of the first pair of exciter elements 6*a*, 6*b* may be coupled to the first exciter element 6*c* of the second pair of exciter elements 6*c*, 6*d*, and the second exciter element 6*b* of the first pair of exciter elements 6*a*, 6*b* may be coupled to the second exciter element 6*d* of the second pair of exciter elements 6*c*, 6*d*. The first exciter elements 6*a*, 6*c* may be coupled to the second exciter elements 6*b*, 6*d*, the couplings being made by means of a second feeding network 13*b* and exciting a second antenna signal having a second polarization. Preferably, the second polarization is orthogonal to the first polarization. The first polarization may, e.g., be −45° and the second polarization +45°.

The first feeding network 13*a* may comprise a power divider coupled to a first phase shifter and the second feeding network 13*b* may comprise a power divider coupled to a second phase shifter. The phase of the second exciter element 6*b*, 6*d* is preferably shifted by 180° compared to the phase of the first exciter element 6*a*, 6*c*. The phase difference between the exciter elements 6 can be changed on each sub-band to achieve optimal performance.

Since the values of the phase shift depend on the frequency, the antenna operation can be tuned to operate on different frequency sub-bands by varying the phase. In addition, tunable elements 7, discussed further below, can be used to tune the impedances of the exciter element 6 ports to be optimal for each sub-band. A multi-channel transceiver IC may generate the required arbitrary phases for the feeding signal which are then fed to the exciter elements 7 through matching networks with fixed components (capacitors/inductors) and tunable elements 7.

Each exciter element 6 may be galvanically, capacitively, or inductively coupled to the antenna radiator 4, as suggested in FIGS. 2 to 9, or to at least one other exciter element 6 and the antenna radiator 4, as suggested in FIGS. 10 and 11. For example, the exciter element 6 may be in direct contact with an antenna radiator 4 in the form of a metal pattern arranged on a glass back cover.

The antenna arrangement 1 may comprise at least one tunable element 7 for tuning the resonant frequencies of the antenna arrangement 1. FIGS. 6 and 8 show one tunable element, while FIG. 10 shows four tunable elements 7. The tunable element 7 may be a varactor, a switch, and/or a phase shifter. The operation of the antenna arrangement can, e.g., be tuned between 3.3-4.2 GHz and have an efficiency of over −6 dB. An average efficiency better than −4.5 dB can be achieved despite the challenging environment and restrictions.

The resonant frequencies may be tuned by the tunable elements 7 in response to the variation of the distance D, D' between the first surface 2*a* of the dielectric element 2 and the first surface 3*a* of the conductive element 3.

Furthermore, the tunable elements 7 may be configured to optimize radiation modes of the antenna arrangement 1 and/or to use a change in the radiation modes for tuning the resonant frequencies.

In other words, the tunable elements 7 can be used to adapt the operation of the antenna arrangement 1 to different types of changes in the operation environment, for example, compensating for a decrease in antenna efficiency due to swelling of the battery or actively reducing the specific absorption rate (SAR) when operated next to the user's body.

In one example of compensating changes in the device structure, battery swelling, the gap between the battery 3*b* and the dielectric element 2 with the antenna radiator 4 decreases from 0.75 mm to 0.45 mm. By utilizing the phase differences and optimal tunable element settings, significant improvements in terms of efficiency can be achieved. By utilizing the tunable elements 7, a clear decrease in SAR can be seen in most of the frequency band.

The tunable elements 7 may be arranged at the peripheral edges of the patch radiator 8, as shown in FIG. 10, each tunable element 7 being arranged adjacent one of the slots 9, preferably one end the slot 9.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

What is claimed is:

1. An antenna arrangement comprising:

a dielectric element;

at least one conductive element;

an antenna radiator arranged at a first surface of the dielectric element and at a distance from the at least one conductive element such that a gap is formed between the antenna radiator and a first surface of the at least one conductive element;

a plurality of exciter elements extending at least partially through the gap and being arranged on or adjacent the at least one conductive element; and at least one tunable element for tuning resonant frequencies of the antenna arrangement, wherein the resonant frequencies are tuned by the at least one tunable element in response to variation of the distance between the first surface of the dielectric element and the first surface of the at least one conductive element.

2. The antenna arrangement according to claim 1, wherein the plurality exciter elements are arranged along a peripheral edge of the antenna radiator.

3. The antenna arrangement according to claim 1, wherein the plurality of exciter elements are superposed with the antenna radiator.

4. The antenna arrangement according to claim 3, further comprising at least a first pair of exciter elements and a second pair of exciter elements, the first pair of exciter elements being decoupled from the second pair of exciter elements.

5. The antenna arrangement according to claim 4, wherein a first exciter element of the first pair of exciter elements is coupled to a second exciter element of the first pair of exciter elements, and a first exciter element of the second pair of exciter elements is coupled to a second exciter element of the second pair of exciter elements, wherein the first pair of exciter elements are coupled to the second pair of exciter elements, through couplings formed by a first feeding network, and wherein the first feeding network excites a first antenna signal having a first polarization.

6. The antenna arrangement according to claim 5, wherein the first exciter element of the first pair of exciter elements is coupled to the first exciter element of the second pair of exciter elements, and the second exciter element of the first pair of exciter elements is coupled to the second exciter element of the second pair of exciter elements, wherein the first exciter elements are coupled to the second exciter elements through second couplings formed by a second feeding network, and wherein the second feeding network excites a second antenna signal having a second polarization, the second polarization being orthogonal to the first polarization.

7. The antenna arrangement according to claim 6, wherein the first feeding network and/or the second feeding network comprise a power divider coupled to a first phase shifter and a second phase shifter, a phase of the second exciter element being shifted by 180° compared to a phase of the first exciter element.

8. The antenna arrangement according to claim 1, wherein each of the plurality of exciter elements is galvanically, capacitively, or inductively coupled to at least one other exciter element and/or antenna radiator.

9. The antenna arrangement according to claim 1, wherein the at least one conductive element is configured such that the distance between the first surface of the dielectric element and the first surface of the conductive element is variable.

10. The antenna arrangement according to claim 1, wherein the at least one conductive element is a battery, and the variation of the distance being due to thermal expansion of the battery.

11. The antenna arrangement according to claim 1, wherein the antenna radiator is a patch radiator.

12. The antenna arrangement according to claim 11, wherein the patch radiator comprises two slots, the two slots extending in parallel in a first direction and being offset in a second direction perpendicular to the first direction.

13. The antenna arrangement according to claim 11, wherein the patch radiator comprises four slots, each of the four slots extending colinearly to another one of the four slots and orthogonally to remaining slots of the four slots, each of the four slots extending from one peripheral edge towards a center point of the patch radiator.

14. The antenna arrangement according to claim 13, further comprising at least one tunable element for tuning resonant frequencies of the antenna arrangement, wherein the at least one tunable element is arranged at the peripheral edges of the patch radiator, each of the at least one tunable element being arranged adjacent one of the four slots.

15. The antenna arrangement according to claim 11, wherein the patch radiator comprises at least one slot, and dimensions of each of the at least one slot and/or a number of slots of the at least one slot are configured to generate one or more desired resonant frequencies.

16. The antenna arrangement according to claim 11, wherein the patch radiator comprises at least one slot.

17. The antenna arrangement according to claim 1, wherein the antenna radiator comprises several individual radiator sections separated by dielectric gaps.

18. An apparatus comprising the antenna arrangement according to claim 1, a display, and a housing, wherein the housing comprises the dielectric element of the antenna arrangement, and wherein the at least one conductive element of the antenna arrangement comprises one of: a battery, a printed circuit board, or an apparatus chassis.

* * * * *